May 12, 1953　　　A. L. RAWLINGS　　　2,637,914
SELF-ORIENTING THREE-AXIS REFERENCE APPARATUS
Filed Sept. 8, 1948　　　　　　　　　　　　　　2 Sheets-Sheet 1

INVENTOR
ARTHUR L. RAWLINGS
BY
Herbert H. Thompson
his ATTORNEY.

May 12, 1953
A. L. RAWLINGS
2,637,914
SELF-ORIENTING THREE-AXIS REFERENCE APPARATUS
Filed Sept. 8, 1948
2 Sheets-Sheet 2
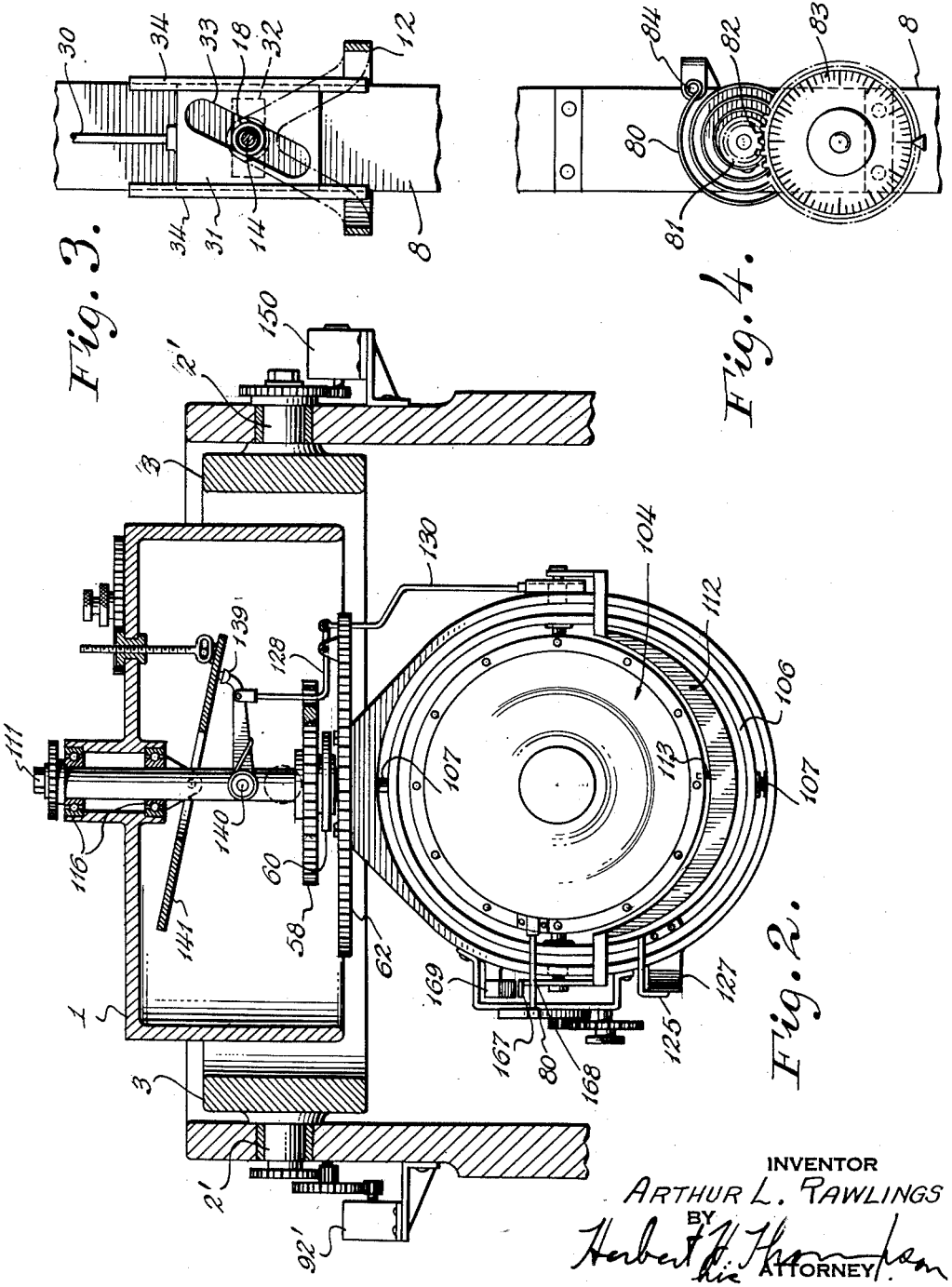
INVENTOR
ARTHUR L. RAWLINGS
BY
Herbert H. Thompson
his ATTORNEY Patented May 12, 1953

2,637,914

UNITED STATES PATENT OFFICE 2,637,914

SELF-ORIENTING THREE-AXIS REFERENCE APPARATUS

Arthur L. Rawlings, Waterbury, Conn., assignor to The Sperry Corporation, a corporation of Delaware Application September 8, 1948, Serial No. 48,227

16 Claims. (Cl. 33—226)

1

The present invention refers to gyroscopic apparatus for providing an orientation reference about three mutually perpendicular axes and is particularly characterised by the fact that apparatus constructed according to the invention can automatically orient itself so as continuously to indicate the horizontal in both the north-south and east-west directions and also indicate the true north in a ship or other moving vehicle with a high degree of precision. That is to say, the apparatus defines with respect to the earth, and stabilizes a frame of reference composed of three mutually perpendicular coordinate axes.

It has been found that the ordinary pendulous gyro compass such as that described for instance in U. S. Patent No. 1,279,471 of 1918 to Elmer A. Sperry not only gives in normal operation a true azimuthal direction, but the axle of the gyroscope also provides a N-S reference line which maintains the horizontal with very high accuracy.

If such a gyro compass could be contrived so as to settle with its gyro axle in an east-west direction instead of north-south, but otherwise to have the same properties as the Sperry gyro compass, a second accurate horizontal datum line would be provided and the common normal to these two reference axes would be a true vertical reference. According to the present invention, two gyro compasses are employed, one of which points north in the ordinary way while the other is constrained from the first compass to point substantially east and west. The spin axle of the east-west pointing gyro maintains itself horizontally with the same accuracy as does the spin axle of the north pointing gyro. The whole instrument is universally supported by a gimbal on a common frame established by servomotors at the gimbal axes controlled by pick-offs from the two gyroscopes. By this means, the anomalous deviations and uncertainties of the current single- or multi-gyro type gyro compass are eliminated. In particular there is no cumulative error due to rolling of the ship causing displacements of the gyro axle, and there is no gimballing error due to inclination of the compass card with respect to the gyro axle. Simple means are provided for completely correcting the ballistic tilt or damping acceleration error which, in the gyro compasses of the present art, causes a wander to occur after any change of northerly speed.

Most self-directing gyro instruments are designed to reach a "steady state" or equilibrium position through a damped oscillation or an asymptotic approach. The steady state may not be the ideal position, but the steady state error is calculable, and can be allowed for. A change in some condition, such as in the speed of the ship, involves a new steady state, and in general, gyroscopic compasses or gyro verticals move from one steady state to another asymptotically or by way of a damped oscillation which takes a considerable time to execute. Hence every change in ship's speed or other governing condition involves a period of perhaps a quarter of an hour while the instrument is settling down to the new steady state, during which its deviation is varying and practically indeterminate. Moreover, repeated changes in governing conditions, for instance by repeatedly changing the course of a ship with a frequency matching the period of the compass, may build up a large oscillation and temporarily destroy the utility of the instrument.

The standard gyro compass, because of its natural period of about 85 minutes has the proper ballistic deflection to partially overcome this defect since, on change of speed or course, the gyro moves dead beat from one steady azimuth to another. Unfortunately it does not at the same time move from one steady tilt to another, and consequently after any change of northerly speed the compass executes a damped oscillation in azimuth. This is of slight importance for ordinary navigation, but in war time, when ships are required to pursue a zig-zag course, the frequency of the compass may resonate with the frequency of the zig-zag and cause serious deviations. For similar reasons such an instrument, whether it be compass or gyro vertical, is unsuited as a datum for gunnery which is generally required to perform with maximum precision shortly after a large change of speed or course has occurred. The present invention provides a combined gyro compass and gyro vertical which, although it initially reaches its steady state, both in azimuth and inclination, by damped oscillations, will thereafter move dead beat to a new steady state in both respects, on any change of speed or course. It follows that while the change is actually in progress, and after its completion, the error of the instrument will have the calculated value corresponding to the instantaneous speed. Provision is made for correcting this error continuously with any desired precision by automatic correction mechanism analogous to the well-known Sperry gyro-compass corrector. All the data for operating this mechanism are provided by the instrument itself excepting only the ship's speed, which can be set in either manually, or automatically by transmission from the ship's log; and the latitude, which changes so slowly and has so small an effect that no perceptible error will result if it is only reset after a 500 mile change.

The combination of gyros according to this invention thus provides not only an indication of the true vertical corrected for errors caused by accelerations of the ship, but also an azimuth indication of unexampled accuracy for use in navigation and gunnery.

The indications of the gyros in the present instrument are affected by the speed and course of the ship and by the latitude of the place in the same manner as those of existing gyro compasses but the deviations due to these causes are easily calculable and provision is made according to the invention for simple direct-acting mechanical correcting means analogous to the speed and course correction devices such as are shown in Patent No. 1,403,062 to E. A. Sperry.

In the case of the well-known Sperry compass such as hereinbefore referred to, it is known that the compass properties are based on two phenomena. First, the gyro axle does not change its inclination to the horizon so long as it is pointing in the meridian; but when displaced from the meridian by a small angle it changes its tilt at a rate which is proportional to the product of the angular deviation, the angular rate of rotation of the earth, and the cosine of the local latitude. Second, the rate of change of deviation of the axle in azimuth for a gyro of specified angular momentum and acted on by a pendulum or other gravitational factor of a specified moment is proportional to the tilt of the gyro axle. Expressed mathematically, these two conditions are $$\frac{db}{dt} = w(\cos L)a$$

$$-\frac{da}{dt} = \frac{Bb}{H}$$

where $b$ is the tilt of the gyro axle
$a$ is the azimuthal deviation
$w$ is the angular velocity of the earth's spin
$L$ is the latitude of the place
$B$ is the pendulous moment exerted on the gyro casing by the gravitational factor
$H$ is the angular momentum of the gyro.

These two formulae lead to an undamped oscillation of the angles $a$ and $b$ with period $2\pi\sqrt{H/Bw \cos L}$. In practice damping means are provided by which the oscillations are quickly wiped out after which the compass settles with steady small values of the angles $a$ and $b$.

In the case of an east-west pointing gyro the second of these two phenomena arises in the same way as before, but the first phenomenon does not arise; that is to say, there is no natural variation in the rate of tilt of the gyro axle with small changes in its azimuth. In order therefore to cause such a gyro to behave as an east-west pointing compass it is necessary to reproduce this first phenomenon artificially. According to the present invention the phenomenon is induced by the simple means of coupling the sensitive element of the east-west compass to the power driven phantom of the north-south compass by a spring which will exert round the vertical axis of the east-west gyro a couple depending on the angle by which the east-west gyro axle deviates from the east-west direction as determined by the north-south compass.

In this way an east-west pointing gyro is provided which has many of the important properties of a north-south compass. It is affected by speed error in the same general manner but the maximum speed error occurs on east-west courses; it is subject to ballistic deflection on changes of east-west speed and the ballistic deflection can be made equal to the change of speed error in much the same manner as is done at present with north-seeking gyro compasses. The east-west pointing gyro axle is moreover constrained to remain horizontal with the same accuracy as the north-south axle of a conventional compass.

The invention also relates to the novel features or principles of the instrumentalities described herein, whether or not such are used for the stated objects, or in the stated fields or combinations.

In the drawings,

Fig. 2 is an east elevation of the instrument shown on line 2—2 in Fig. 1;

Fig. 3 is an enlarged view showing details of the ballistic tilt corrector;

Fig. 4 is an enlarged view of a spring device in the apparatus.

Figure 1:
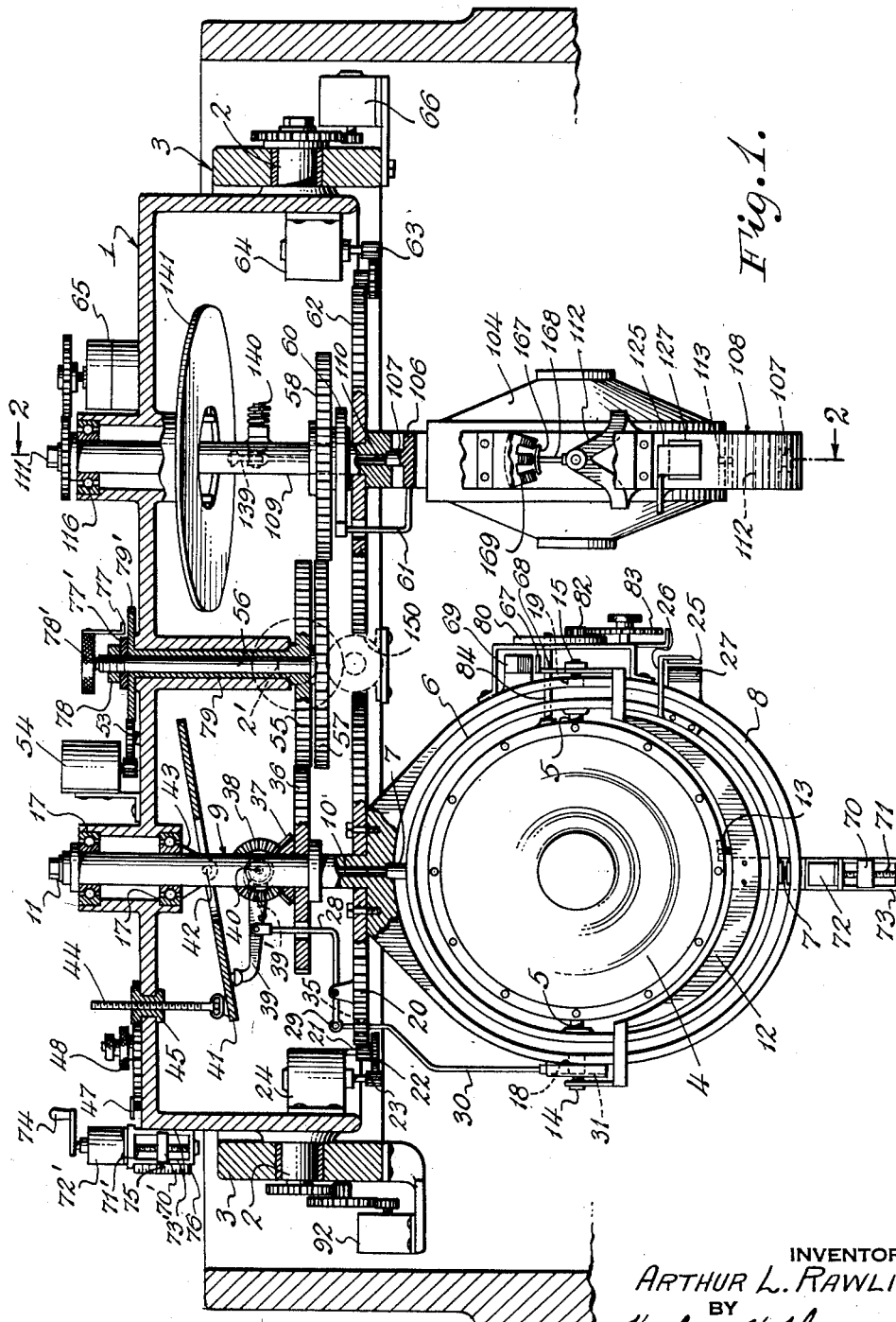
Fig. 1 is a south elevation, partly in section, of the complete instrument.

Referring to Fig. 1 the apparatus is carried by a platform or frame 1 which is gimballed at 2, 2 in a horizontal gimbal ring 3 said gimbal ring being further supported about an axis at right angles to 2, 2 by a second set of gimbal pivots, 2', 2', in a binnacle. In the drawing of Fig. 1 the north seeking gyro compass is shown on the left side of the frame and the west seeking compass on the right.

The north seeking gyro rotor (not shown) is spun by conventional means inside a rotor casing 4 which is supported by horizontal bearings 5, 5 in a vertical ring 6. The vertical ring in its turn is supported by vertical bearings 7, 7 in a phantom ring 8 which surrounds it. The phantom ring has an upwardly extending stem 9 which is supported in frame 1 by ball bearings 17 so that it is free to turn in azimuth. The weight of the gyro and vertical ring is carried by a wire filament suspension 10 which passes up through the hollow stem 9 and is held by clamp 11 at the top of said tubular stem.

The gyroscope, in the embodiment shown, is arranged to run clockwise as seen from the south side and is caused to be north seeking by a gravitational factor in the form of a pendulous attachment similar to that of the Sperry Patent 1,279,471, already referred to; but it will be understood that if preferred the gyroscope may run counterclockwise as seen from the south in which case it must be anti-pendulous or top heavy and that the gravitational factor may assume other forms. As shown in Fig. 1 the pendulum consists of a bail 12 which is pivoted in the phantom ring 8 by pivots 14 and 15 which turn in ball bearings at 18 and 19 in the phantom in line with the rotor casing bearings 5, 5. The connection between the bail 12 and the gyro casing 4 is made through a pin 13 which for purposes of damping, is set slightly to the east of the vertical axis of the pivots 7, 7. An azimuth gear 20 secured to the phantom is driven by an azimuth motor 24 carried on frame 1 and having a pinion 23 which drives the azimuth gear through wheel 22 and pinion 21. The azimuth motor 24 is controlled by a conventional pick-off of the type known as an "E" pick-off embodying a signal transformer unit 27 mounted on the phantom ring and a movable armature 26 carried on a bracket 26 from the compass vertical ring 6. Of the three windings on the transformer unit 27, the central winding is the primary, excited by a source of alternating current, and the other two windings, which are connected as series opposed secondaries in accordance with the teachings of U. S. Patent No. 1,959,804, to Wittkuhns et al., supply an output signal of phase and magnitude depending upon the direction and amount of angular displacement about the bearings 7, 7 of the vertical ring 6 and the phantom ring 8. The output of the secondary windings of the transformer 27, after amplification in an amplifier (not shown), is applied to the azimuth motor 24 in such a manner that the phantom ring 8 is maintained constantly coplanar with the vertical ring 6.

In order that the north-south compass may have a correct ballistic deflection, it is necessary that the pendulous moment of the bail 12 should be varied according to the secant of the latitude and for this purpose an auxiliary weight is provided in the shape of a heavy nut 70 riding on a threaded extension 71 of a small electric motor 72 carried on the bail 12. Guides 73 allow the nut 70 to be raised and lowered without turning as the motor 72 is driven in one direction or the other and by this means the total pendulous moment of the bail can be adjusted to give correct ballistic deflection; and the period of oscillation of the north-south compass will then correspond to an undamped period of about 84 or 85 minutes. The motor 72 may conventionally be made as a selsyn motor remotely controlled from a selsyn transmitter 72' shown as mounted on the frame 1 of the compass, though it may equally well be fixed to an adjacent bulkhead. The transmitter 72' also has a threaded extension 71' on the shaft which causes the nut 70' to be traversed between the guides 73' when the transmitter shaft is turned by the handle 74. The nut 70' carries a pointer 75 moving over a scale 76 calibrated in degrees of latitude so that when the pointer is set to the latitude of the ship the transmitter will operate the selsyn motor 72 and cause the nut 70 to be raised in lower latitudes or lowered in high latitudes by the necessary amount to give the bail 12 the proper pendulous moment.

The west pointing gyro compass is generally similar to the north pointing compass and consists of a gyro rotor contained in the gyro casing 104 which is supported by horizontal bearings in a vertical ring 106. The vertical ring is supported by vertical bearings 107, 107 in phantom ring 108 which has a tubular stem 109 supported by bearings 116 in the frame 1. The weight of the vertical ring and gyro is supported by a suspension wire 110 clamped at 111 in the top of the stem. The east-west compass is provided with a bail 112, which may be similar to that of the north-south compass, except that its pendulous moment need not be variable. This bail is pivoted in the phantom ring in line with the horizontal diameter of the gyro rotor. The bail is connected to the rotor case 104 by an eccentric pin connection 113 which is set slightly to the north of the vertical line 107, 107 for purposes of damping. The gyro rotor of the east-west compass is normally rotated clockwise as seen from the east. The phantom ring 108 of the east-west compass is caused to follow the vertical ring 106 by means of a signal transformer or "E" pick-off 127 and cooperating armature 125 similar to parts 27 and 25 in the north-south compass. These control the azimuth motor 64 of the east-west compass which drives the azimuth gear 62 through pinion 63.

The control of the east-west compass by the north-south compass is preferably contrived as follows: the stem 9 of the phantom ring of the north-south compass carries a gear wheel 36 which, subject to the operation of a corrector mechanism hereinafter described, turns with the phantom ring and drives the equal wheel 55 mounted on the vertical shaft 56. For reasons explained hereinafter, the wheel 55 is adjustably secured to shaft 56, being attached to a pipe 79 journalled in frame 1 and having a flange 79' above the surface of the frame. Shaft 56 is rotatable in pipe 79 and carries at its lower end wheel 57, and at the upper end a knob 78' pinned solidly to it, and a nut 78 with a washer 77'. When the relative positions of wheels 55 and 57 are to be changed, the nut 78 is slackened, wheel 57 is rotated relatively to wheel 55 by the knob 78' and the two wheels are then locked together by tightening nut 78. A pointer 77 moving over a scale on flange 79' indicates the relative positions of the two wheels 55 and 57. The wheel 57 drives an equal sized wheel 58 which is mounted for free rotation on the stem 109 of the phantom ring of the west pointing compass. This arrangement of gears is for the purpose of reproducing the motions of the wheel 36 in coaxial relation to the stem 109 of the east-west compass in spite of the fact that the frame 1 is oriented by the ship and may have any geographical direction, whereas the wheel 36 is oriented as a compass card. The operation of the gear may be seen as follows. If the frame 1 be considered fixed and the wheel 36 be given a definite rotation, say of one complete turn with respect to the frame, the wheel 58 will also make one turn with respect to the frame and in the same direction. It follows that if the wheel 36 is fixed and the whole apparatus including frame 1 be turned in azimuth through any angle with respect to the wheel, the frame will also turn through the same angle and in the same direction with respect to wheel 58. Therefore, wheel 58 will remain oriented in the same way as wheel 36, no matter how the ship changes course.

Projecting upwardly from vertical ring 106 of the east-west compass is a rod 61 which passes clear through an opening in azimuth gear 62. A spiral spring 60 has one end attached to wheel 58 and the other end attached to the extremity of rod 61. This spring 60 being secured at one end to the wheel 58, and power driven by the azimuth motor 24 of the north-south compass, thereby applies to the vertical ring 106 of the east-west compass a torque which depends on the difference of azimuth of the two gyro axles. By this means the spring 60 in the operation of the east-west compass takes the place of the earth's rotation in causing tilting of the gyro axle.

In the case of the conventional gyro compass, the rate of tilt of the gyro axle for a given deviation varies as the cosine of the latitude, but the stiffness of the spring 60 which causes tilting of the east-west gyro axle when it is deflected in azimuth is independent of the latitude. From this it follows that if the north-south compass were supposed to be at rest with the gyro axle on the meridian while the east-west compass was oscillating, the period of oscillation would not have the same variation with latitude as the period of a conventional compass. The exact period of the east-west compass, however, is a matter of no importance since the ballistic deflection does not depend on the compass period as it does in the case of the north-south compass.

The pointer 77 fixed to the shaft 56 moves over a scale engraved on the flange 79' of the wheel 55 that is calibrated in degrees of latitude. By this means an initial stress is given to the spring 60 which causes precession of the east-west gyro round its horizontal diameter at just such a rate as will neutralize the earth's rotation component round a north-south horizontal line in the latitude at which the pointer 77 is set, while at the same time the gyro axle continues to point east and west.

The angle of initial stress to be given to the spring 60 depends on the stiffness of the spring or in other words on the torque which it applies to the east-west gyro per radian of deflection. The stiffness can be varied within considerable limits without affecting the operation of the instrument, but it is recommended that the spring be made relatively weak so that at the equator the angle of initial stress required should be about 100° to cause the gyro to precess in the direction east end down at an absolute rate of 15° an hour, this being equal to the earth's rotation about its axis. Since the component of the earth's rotation varies as the cosine of the latitude, the initial stress of spring 60 may be reduced in the same proportion as the ship moves to higher latitudes. Thus at latitude 40° the initial stress should be 76½° and at latitude 60° the stress should be 50°. The scale engraved on flange 79' is calibrated accordingly. Since the gyro of the east-west compass rotates clockwise as seen from the east, the sense of the torque round the vertical, which spring 60 applies to make the gyro precess and follow the earth's rotation in tilt, is from north through west to south or counterclockwise as seen from above.

The east-west gyro will be affected by speed error similar to that of the north-south gyro but for a different reason. Let it be supposed, for example, that the ship at anchor is in latitude 40° and is being carried towards the east by the earth's rotation at a speed of 700 knots. If the ship now steams in an easterly direction at say 10 knots the ship's speed over the earth will be added to the speed of the earth itself and the total will be 710 knots or 1/70 greater than before. In order that the gyro axle should be able to remain horizontal under the new conditions, its rate of precession, and therefore the couple due to the spring 60, must be also 1/70 greater than before. This will be the case if the axle of the east-west gyro is displaced by 1/70 of the initial stress of the spring 60, or slightly more than 1° clockwise as seen from above. The gyro will, therefore, settle with this new deflection, and this is the speed error for 10 knots.

Put more generally, the earth's rotation corresponds to a peripheral speed at the equator of 900 knots, or at any other place in latitude L, to 900 cos L knots. A ship at anchor therefore will have this velocity in space. If, however, a ship should be travelling eastward over the earth at a rate of K knots the proportional increase in its total speed due to its own movement would be $$\frac{K}{900 \cos L}$$

In order that the east-west gyro axle should remain horizontal, it must have a proportionally greater rate of precession, east end down, than when the ship was at anchor, and this increased precession will be caused by a corresponding increase of the couple round the vertical from the spring 60 which will be produced by a proportional increase of its initial set. As hereinbefore described, the angular amount of the initial set for earth's rotation only is 100° cos L. The extra initial stress required to take care of the ship's speed is $$100° \cos L \times \frac{K}{900 \cos L} \text{ or } \tfrac{1}{9} K \text{ degrees}$$

The change in the initial stress will be produced by relative movement between the wheel 58 and the vertical ring 106 of the east-west compass since spring 60 is connected between them. If wheel 58 remains fixed in direction, the extra initial stress will be automatically obtained by the gyro shifting its settling position clockwise through an angle equal to ⅑ K degrees. This then is the speed error and it depends only on the easterly component of the ship's speed over the ground and not on the latitude. If the ship's speed is K knots in a direction making an angle C with the north (so that C is the compass course) and if S be the initial stress angle of spring 60 at the equator the speed error is given by the formula:

$$E = \frac{SK \sin C}{900}$$

If by some means the gyro axle can be deflected to this new position, on change of speed or course, it will remain there without oscillation either in tilt or azimuth. As a matter of fact while the ship is accelerating from rest to the new speed in an easterly direction, the east-west gyro will experience a ballistic deflection due to the bail 112, and this deflection will be proportional to the change in speed error and in the same direction as the speed error. Hence by making the pendulous moment of the bail of the right amount the ballistic deflection will carry the gyro axle dead-beat to the new resting position.

From this it follows that the pendulous moment of the bail of the east-west compass does not need to be varied according to the latitude as in the case of the north-south compass since the speed error is independent of the latitude.

It is to be noted that if the initial stress of spring 60 is maintained at the proper value according to the latitude by setting at the scale on wheel 55 the actual deviation of the east-west compass axle will only be that of the speed error as described hereinbefore. It is not necessary that this setting of the initial stress for earth's rotation should be very accurately made since if the proper initial stress is not put in through the wheel 58 the compass will automatically acquire a deviation so as to keep the initial stress of the spring correct. The east-west compass is not used according to the invention as an azimuth indicator, but solely to afford an indication of the direction of the horizontal, reliance for azimuth being had on the north-south compass. Consequently, it is of no practical moment if the east-west compass should deviate in azimuth from the true east-west direction by several degrees since the horizontality of its axle will not thereby be affected. If there is a deviation of this compass from the true east-west the servomotor couple applied to the frame 1 by the servomotor 150 referred to below will not act round an axis quite parallel to the axis of the pick-off, but this will not introduce any undesirable complication. A horizontal plane is uniquely defined by two horizontal lines, whether these intersect in a right angle or some smaller angle.

The north-south compass has a speed error as is usual with the conventional gyro compass, its amount being given by the formula:

$$\frac{K \cos C}{900 \cos L}$$

This error must be eliminated at some point between the vertical ring 6 and the wheel 53 of the east-west compass, firstly to obtain a true azimuth indication from the instrument and secondly to provide a fixed-azimuth abutment for the spring 60 which controls the east-west compass. Correcting devices for gyro compass are well known, one form being shown, for instance, in the above-mentioned U. S. Patent 1,403,062 to E. A. Sperry. In Sperry's device the correction was introduced by shifting the lubber ring without changing the orientation of the compass card, and this form of corrector is unsuitable in the present case. In Harding's U. S. Patent 2,110,766 the correction is introduced between the phantom ring and the compass card.

In the present invention, as shown in Fig. 1, the corrector works on the same principle as that of Harding. The gear wheel 36 which gears with intermediate wheel 55 rides loose on the stem 9 of the phantom ring of the north seeking compass. Wheel 36 has a bevel gear 37 secured to its upper side, gearing with a bevel-toothed sector 38 rotatable about a horizontal pivot 40 projecting radially from stem 9. Sector 38 has a projecting arm 39 which rides on a flat ring 41 pivoted about a diameter at 42 in a pair of lugs 43 forming part of frame 1. A spring 39′ presses arm 39 into contact with the lower surface of ring 41.

The inclination of ring 41 can be varied according to speed and latitude of the ship by a threaded rod 44 which is journalled at 45 in a nut carried by frame 1 and can be set by the knob 46. A pointer 47 carried by knob 48 cooperates with a scale calibrated in any well known manner so that the angle of tilt of ring 41 corresponds to the prevailing speed and latitude.

The inclined ring 41 with its setting mechanism, being mounted on frame 1, turns as the ship changes course. The bevelled sector 38 with its arm 39, being carried on the compass phantom element, has a substantially fixed orientation. When the ship is on a north course and the speed error is westerly, arm 39 rests on the lowest part of ring 41, and the wheel 36 then has its maximum displacement easterly on the stem 9. In this way, the correction is automatically made to be proportional to the cosine of the course angle.

The true angle of the ship's course can be transmitted to other parts of the ship to operate repeater dials. An electric transmitter for this purpose is indicated schematically at 54, as mounted on the upper frame 1. A pinion 53 on the shaft of the transmitter gears with wheel 79′, so that corrected indications are signalled by the transmitter.

Since the earth's rotation has a component about the vertical at the rate of 15° per hour multiplied by the sine of the latitude, both the north-south and east-west compasses must precess at this rate if they are to maintain a constant orientation. In the commercial Sperry compass this precession is secured by allowing the gyro and bail to tilt through a small angle so that the pendulous moment of the bail applies the requisite precessing couple.

As this tilt of the bail would introduce a small error into the horizon indication, the precessing couple is provided by a light spiral spring 80 coupled between the gyro casing and the phantom ring as shown in Fig. 4. The phantom ring 8 carries a rotatable dial 83 calibrated in terms of sine latitude. The edge of the dial is cut with gear teeth which engage a pinion 82 also rotatably mounted on the phantom ring. This pinion carries a hub 81 into which the inner end of the spring 80 is pinned. The outer end of the spring is clamped in a bracket 84 projecting from the gyro casing. The axis of hub 81 on the phantom is coaxial with horizontal gyro bearings 5.

The spring 80 is preferably made weak so that a rotation of about 360° of hub 81 is required to apply such a torque to the gyro as will cause it to precess at 15° per hour. By this means the device is made comparatively insensitive to small errors in the verticality of phantom 8, or in the alignment of the axis of hub 81 and the horizontal bearings 5 of the gyro casing. The calibration of dial 83 is such that when it is set to the latitude of the ship spring 80 applies to the gyro just the right torque to make it keep up with the earth.

It will be understood that both the east-west and north-south compasses are fitted with latitude springs as shown in Fig. 4, and that the calibration of dial 83 is such that spring 80 applies no torque to the gyro when set for zero latitude.

Because, in both compasses, the connection between bail and gyro casing is not in the vertical plane through the gyro axle, but is slightly offset to cause damping of the oscillations, it follows that when a ballistic deflection occurs, the gyro axle does not move entirely in the horizontal plane, but tilts slightly. Unless means were taken to prevent it, this would not only introduce a temporary error into the horizon indication of the instrument, but would also cause an oscillation in azimuth. According to the present invention, therefore, it is arranged that although the gyro casing tilts on acceleration, as described above, the bail itself does not tilt. This may be accomplished by moving the bail pivots north or south relatively to the horizontal gyro bearing 5 so that while the gyro is tilted the bail hangs plumb. It follows that the horizon indication, being taken from the bail, will show no error, and the compass will not make any subsequent oscillation in azimuth.

If the eccentric angle of the damping connection be called $r$, the change of tilt of the gyro will always be $r$ times the ballistic deflection. At any time, when the northerly speed of the ship is K, the sum of all the ballistic deflections incident to attaining that speed will be equal to the speed error, so the ballistic tilt of the gyro will be $r$ times the speed error. The total angle by which the bail must be offset from the pendulous gyro will also be $r$ times the speed error. Since the movement of arm 39 in the correction gear of the north seeking compass is proportional to the speed error, and the tilt of the gyro to be corrected is only about $\frac{1}{10}$ of a degree, it is only necessary to connect one of the bail bearings by a linkage to arm 39 to obtain the desired result.

One method of doing this is shown schematically by way of example in Fig. 3.

The ball bearing 18 which carries the bail pivot 14 is carried by a horizontal slot 32 in the phantom ring. The outer face of the bearing also projects into a sloping slot 33 in a plate 31 which can slide vertically between guides 34 on the phantom ring. When plate 31 is moved vertically, the bail pivot 14 moves horizontally. A rod 30 secured to the top of plate 31 passes up through a hole 35 in azimuth gear 20 and is hinged at 29 to one end of lever 28. Lever 28 has its fulcrum in a bracket on the azimuth gear, and its other end is hinged to lever 39. Consequently, as lever 39 moves with varying speed error, bail pivot 14 is moved by a proportional, but much smaller amount horizontally in the phantom ring, and the bail is thereby continually kept plumb though the gyro itself tilts according to the speed error.

The amount of the ballistic tilt at average speeds and latitudes is about 5 minutes of arc. In high latitudes at speeds above 40 knots its probable maximum value would be about 15 minutes. It follows that the horizon indication will be not substantially affected by considerable errors in the latitude setting given to the cam ring 41.

In the case of the east-west compass no azimuth correction or speed error is required since the azimuth indications of this compass are not utilized. However, a ring 141 is provided which can be given a tilt proportional to the speed only of the compass in an E-W direction, and which cooperates with lever 139 pivoted at 140 on the compass stem to displace lever 128 through an angle proportional to speed multiplied by the sine of the course. Lever 128 then raises or lowers rod 130 so as to displace a diagonally slotted plate 131 and shift one bail pivot horizontally in the phantom ring exactly as shown for the north-south compass.

In order that the frame 1 shall be stabilized in its gimbal axis, both compasses are provided with pick-offs controlling servomotors on the gimbal axes. In the case of the north-south compass, Fig. 1 shows an "E" pick-off with three windings schematically indicated at 69 as carried by the phantom ring. This pick-off cooperates with an armature 67 supported by a bracket 68 on the bail 12. On the occurrence of any angular movement about the axis 15 between the bail 12 and the phantom ring 8, a signal from the pick-off 69 is transmitted through a resolver 65 to a torque motor 66 on the gimbal axis 2 and the motor then restores the frame 1 to the upright position and drives the pick-off components 67 and 69 back into line. The resolver 65 is a variable transformer arrangement having one winding system rotating with the phantom stem 116 and one winding system being carried by frame 1. The output from transformer 69 is applied to a torque motor about the appropriate axis although the relative position say of the horizontal bearings 5, 5 of the north seeking compass and the gimbal axis 2, 2 of the frame 1, will vary as the ship changes course. Resolvers of this type are shown in the patent to Noxon 2,513,738, dated July 4, 1950, and in application Serial No. 693,055, now Patent No. 2,591,697, of Robert F. Hays, Jr., assigned to the assignee of the present application.

For stabilizing the frame about the north-south horizontal axis, a second "E" pick-off 169 is provided and carried on the phantom ring 108 of the east-west compass. It cooperates with an armature 167 supported by a bracket 168 from the bail 112. The output of the pick-off also passes through the resolver and controls a second servomotor 150 on the gimbal axis 2' at right angles to the first. In order to transmit the angles of roll and pitch of the ship about the gimbal axes 2, 2 and 2', 2' transmitters are provided which are shown schematically at 92 and 92' in Figs. 1 and 2.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyroscopic device defining a horizontal line substantially perpendicular to the meridian comprising a north seeking first gyro compass having a power driven phantom element, a gravitationally controlled second gyro compass so constructed that unless otherwise controlled its gyro axle would lie substantially level and on the meridian, dampers for damping the oscillations of said gyro compasses, an elastic connection between the phantom element of said first gyro compass and said second gyro compass normally applying a torque to said second gyro compass about its vertical axis and causing it to precess about a horizontal axis east end downward at a rate corresponding to the local component of the earth's rotation whereby the gyro axle of said second gyro compass is constrained to point substantially east and west, adjustable means for applying a torque about the horizontal axis of at least the first gyro compass causing it to precess about its vertical axis at a rate equal to the local component of the earth's rotation, and means for counteracting the effect of tilt of the second gyro compass caused by east-west accelerations acting on its damper.

2. A combined gyro compass and gyro vertical for mobile craft comprising a universally supported frame, two gyro compasses mounted on said frame having relatively movable sensitive elements and power driven followers, a yielding connection between the power driven follower of the first gyro compass and the sensitive element of the second gyro compass, and means for adjusting said yielding connection so that the gyro axle of said second compass normally lies substantially horizontal and substantially east and west.

3. A combined gyro compass and gyro vertical as claimed in claim 2 wherein the second gyro compass is controlled by a gravitational factor and, including means for varying the moment of said gravitational factor in accordance with the adjustment of the yielding connection so that the ballistic deflection on change in easterly speed carries the gyro axle dead beat from the resting position corresponding to the speed before the change to a new resting position corresponding to the speed after the change.

4. A gyroscopic instrument as claimed in claim 2 wherein the first gyro compass is controlled by a gravitational factor, and including means for varying the moment of said gravitational factor in accordance with the latitude of the craft so that on change of northerly speed the azimuthal ballistic deflection will be equal to the change in speed error and the ballistic change of tilt will be a predetermined proportion of the ballistic change of azimuth.

5. A combined gyro compass and gyro vertical, as claimed in claim 2, in which said yielding connection includes a spring, and which further comprises means for adjusting the effectiveness of said spring on the second gyro compass in accordance with the latitude of the carrier.

6. In a gyroscopic compass having a universally supported frame, a gyro casing and a separately pivoted gravitational factor connected to the gyro casing by an eccentric connection to effect damping, means for annulling the effect of ballistic tilt, said means comprising means for setting at least one of the pivots of said gravitational factor out of line with the pivot of the gyro casing by an amount proportional to the existing speed error due to the speed at which the compass is carried, whereby the gravitational factor remains plumb at all times in spite of the ballistic tilt of the gyro casing.

7. A gyro compass as claimed in claim 6, having a horizon reference and means controlled by the position of said gravitational factor for maintaining said horizon reference level.

8. A stabilized three-axis gyroscopic reference device for use in movable craft comprising a universally supported platform, a first gyro compass rotatably mounted on said platform and arranged to point substantially north and south, a second gyro compass mounted on said platform and arranged to point east and west, each compass having a gravitational factor, a signal pick-off to measure relative tilt between said platform and the gravitational factor of each of said gyro compasses, and servomotors operatively connected to said platform controlled by the signals of said pick-offs to stabilize said platform.

9. In a stabilized three-axis gyroscopic reference device, a universally supported frame, an east-west gyro compass, and a north-south gyro compass rotatably mounted on said frame, a yielding connection between said compasses by which the east-west compass is maintained substantially in a direction normal to the north-south compass, means for adjusting said elastic connection according to the latitude of the device so that the east-west compass continues to point substantially east-west in any navigable latitude when the device is stationary relative to the earth's surface.

10. In a stabilized three-axis gyroscopic reference device for use on mobile craft, a universally supported platform, a first gyro compass having a phantom element rotatably mounted on said platform and a gyroscopic rotor with a horizontal spin axis oriented in a north-south direction, a second gyro compass having a vertical ring mounted on said platform with freedom about a vertical axis and a gyroscopic rotor with a horizontal spin axis; and means for controlling said second gyro compass so that the spin axis of the rotor thereof is constrained in an east-west direction including an elastic connection between the vertical ring of the second gyro compass and the phantom element of said first gyro compass.

11. A reference device as claimed in claim 10, in which said controlling means includes means operable to modify the effectiveness of said elastic connection in accordance with the speed, latitude and course of the craft.

12. A stabilized reference device as claimed in claim 10, including servomotors operable to stabilize the platform, and means for operating said servomotors including signal pick-offs for each of the gyro compasses for measuring the tilt of the platform relative to the horizontal plane generally defined by the mutually perpendicular spin axes of the rotors of the gyro compasses.

13. In a stabilized three-axis gyroscopic reference device for use on movable craft, a universally supported platform, a first gyro compass having a power driven phantom element rotatably mounted on said platform and a sensitive element with a normally horizontal gyro axle oriented in a north-south direction, a speed, latitude and course corrector for correcting the speed, latitude and course error of said first gyro compass, a second gyro compass having a vertical ring rotatably mounted on said platform and a sensitive element with a normally horizontal gyro axle, a member coaxial with the axis of the vertical ring driven through said speed, latitude and course corrector by the phantom element of the first gyro compass, and a spring connecting said member and the vertical ring of the second gyro compass operable to constrain the gyro axle of the second gyro compass in an east-west direction.

14. A gyroscopic device defining two horizontal lines substantially normal to one another comprising a north seeking first gyro compass having a power driven phantom element, a gravitationally controlled second gyro compass so constructed that unless otherwise controlled its gyro axle would lie substantially level and on the meridian, an elastic connection between the phantom element of said first gyro compass and said second gyro compass normally applying a torque to said second gyro compass about its vertical axis upon departure of the second compass from an E-W position whereby the gyro axle of said second gyro compass is constrained to point substantially E-W, and adjustable means for applying a torque about the horizontal axis of each gyro compass and causing it to precess about its vertical axis at a rate equal to the component of the earth's rotation about a local vertical axis.

15. A combined gyro compass and gyro vertical including a N-S gyro compass and an E-W gyro compass, a pendulum for imparting orientation in azimuth to each compass, upon tilt thereof from its normally horizontal position, the pendulum for the first compass being pivoted on an E-W axis and the pendulum for the second compass being pivoted on a N-S axis, a pick-off on each pendulum for transmitting the position thereof about its said axis, a compass reference actuated from said N-S compass, a horizon reference, and means for maintaining said horizon reference horizontal actuated from both of said pick-offs.

16. A combined gyro compass and gyro vertical as claimed in claim 15, having means horizontally offsetting the pivotal axis of the pendulums with respect to the gyroscopes in accordance with a function of the speed and course of the carrier.

ARTHUR L. RAWLINGS.

References Cited in the file of this patent

UNITED STATES PATENTS

| Number | Name | Date |
|---|---|---|
| 1,031,769 | Barr et al. | July 9, 1912 |

FOREIGN PATENTS

| Number | Country | Date |
|---|---|---|
| 496,898 | Germany | Apr. 28, 1930 |